US008155047B2

(12) United States Patent
Eguchi

(10) Patent No.: US 8,155,047 B2
(45) Date of Patent: Apr. 10, 2012

(54) COMMUNICATION STATION, COMMUNICATION METHOD, COMPUTER-READABLE STORAGE MEDIUM, AND COMMUNICATION SYSTEM, FOR RELAYING RECEIVED DATA

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 12/401,574

(22) Filed: Mar. 10, 2009

(65) Prior Publication Data
US 2009/0245275 A1    Oct. 1, 2009

(30) Foreign Application Priority Data
Apr. 1, 2008    (JP) ................. 2008-095434

(51) Int. Cl.
*H04J 3/08*    (2006.01)
(52) U.S. Cl. ..................... 370/315; 370/501
(58) Field of Classification Search .......... 370/315, 370/321, 328, 336, 337, 345, 347, 442, 458, 370/498, 501
See application file for complete search history.

(56) References Cited

U.S. PATENT DOCUMENTS

| | | | |
|---|---|---|---|
| 5,539,687 A | 7/1996 | Torisawa et al. | 364/821 |
| 5,708,402 A | 1/1998 | Hachisu et al. | 333/133 |
| 5,760,525 A | 6/1998 | Hachisu et al. | 310/313 |
| 5,815,055 A | 9/1998 | Eguchi et al. | 333/193 |
| 5,917,850 A | 6/1999 | Fujita et al. | 375/200 |
| 5,936,997 A | 8/1999 | Kanda | 375/200 |
| 6,020,672 A | 2/2000 | Yokota et al. | 310/313 |
| 6,298,405 B1 | 10/2001 | Ito et al. | 710/107 |
| 6,625,162 B2 | 9/2003 | Myojo et al. | 370/445 |
| 2002/0051425 A1 * | 5/2002 | Larsson | 370/252 |
| 2003/0133422 A1 | 7/2003 | Bims | 370/328 |
| 2003/0134590 A1 | 7/2003 | Suda et al. | 455/3.06 |
| 2004/0174844 A1 | 9/2004 | Cho et al. | 370/328 |
| 2006/0028553 A1 | 2/2006 | Mori et al. | 348/207.99 |
| 2006/0256741 A1 | 11/2006 | Nozaki | 370/278 |
| 2006/0291410 A1 | 12/2006 | Herrmann | 370/328 |
| 2007/0060158 A1 * | 3/2007 | Medepalli et al. | 455/450 |
| 2007/0127412 A1 | 6/2007 | Dent | 370/329 |

(Continued)

FOREIGN PATENT DOCUMENTS
JP    61-210745    9/1986
(Continued)

OTHER PUBLICATIONS

European Search Report dated Jul. 8, 2009 in corresponding European Application No. 09 003 636.9.

(Continued)

*Primary Examiner* — Ricky Ngo
*Assistant Examiner* — Wei-Po Kao
(74) *Attorney, Agent, or Firm* — Fitzpatrick, Cella, Harper & Scinto

(57) ABSTRACT

A communication station receives data from a transmission station, transmits a reception response representing the data reception condition, and determines, based on reception responses from other communication stations, whether communication station which has not normally received the data from the transmission station exists among the other communications. Upon normally receiving the data from the transmission station, and determining that the communication station which has not normally received the data from the transmission station exists, the communication station transfers, to the communication station which has not normally received the data, the data received from the transmission station. upon transferring, it is decided, based on a predetermined priority order, whether or not to perform the transfer to the communication station which has not normally received the data.

8 Claims, 10 Drawing Sheets

U.S. PATENT DOCUMENTS

| | | | |
|---|---|---|---|
| 2007/0240191 A1* | 10/2007 | Singh et al. | 725/81 |
| 2008/0137585 A1* | 6/2008 | Loyola et al. | 370/315 |
| 2008/0222478 A1* | 9/2008 | Tamaki | 714/749 |
| 2008/0253354 A1 | 10/2008 | Eguchi | 370/350 |
| 2008/0304459 A1 | 12/2008 | Eguchi | 370/338 |

FOREIGN PATENT DOCUMENTS

| | | |
|---|---|---|
| JP | 8-163128 | 6/1996 |
| JP | 11-252114 | 9/1999 |
| JP | 2007-502564 | 2/2007 |
| JP | 2007-266876 | 10/2007 |
| WO | 01/61928 | 8/2001 |
| WO | 2006/020520 | 2/2006 |

OTHER PUBLICATIONS

U.S. Appl. No. 12/999,720, filed Dec. 17, 2010 by Tetsuo Kanda.

* cited by examiner

COMMUNICATION STATION, COMMUNICATION METHOD, COMPUTER-READABLE STORAGE MEDIUM, AND COMMUNICATION SYSTEM, FOR RELAYING RECEIVED DATA

BACKGROUND OF THE INVENTION

1. Field of the Invention

The present invention relates to a technique of relaying received data between communication stations.

2. Description of the Related Art

For efficient data communication between a transmission station and a plurality of reception stations, a method of multicasting one packet containing data to the respective reception stations is known. A method of raising the efficiency of a reception response has also been examined (Japanese Patent Laid-Open No. 2007-502564).

There is examined a technique of causing a transmission station to resend data if a reception station cannot directly receive the data from it in multicast communication (Japanese Patent Laid-Open No. 08-163128). A technique of causing a relay station to transfer data has also been examined (Japanese Patent Laid-Open No. 11-252114).

In multicast communication, however, a communication station designated as a relay station cannot normally receive data from a transmission station in some cases due to a change in the communication link caused by obstruction (e.g., a static obstacle such as a wall or a dynamic obstacle such as a person). When the communication link changes due to a static obstacle such as a wall, transfer via a predetermined relay station enables communication. On the other hand, when the communication link changes due to a dynamic obstacle, the relay station cannot be determined in advance. It is therefore impossible to accurately transmit data to a communication station which cannot directly receive data from a transmission station.

In a system that enables data reception from a plurality of relay stations using a mesh topology, data transmission will reliably be performed at a very high probability even when the communication link changes due to a dynamic obstacle. However, a station repeatedly receives the same data a plurality of number of times even when it has already successfully received the data. This operation increases the power consumption.

Additionally, transferring data to a communication station which has already correctly received the data wastes the band of a wireless medium. This also increases power consumption of each terminal and interference to another communication system.

SUMMARY OF THE INVENTION

The present invention enables to provide a communication station, communication method, computer-readable storage medium, and communication system capable of increasing the reliability of data communication and suppressing redundant data communication.

According to a first aspect of the present invention, there is provided a communication station comprising: a reception unit configured to receive data from a transmission station; a response unit configured to transmit a reception response representing a reception condition of the data by the reception unit; a determination unit configured to determine, based on reception responses from other communication stations, whether communication station which has not normally received the data from the transmission station exists among the other communications; and a transfer unit configured to, when the reception unit has normally received the data from the transmission station, and the determination unit has determined that the communication station which has not normally received the data from the transmission station exists, transfer, to the communication station which has not normally received the data, the data received by the reception unit, wherein the transfer unit decides, based on a predetermined priority order, whether or not to perform the transfer to the communication station which has not normally received the data.

According to a second aspect of the present invention, there is provided a communication method of a communication station, comprising: transmitting a reception response representing a reception condition of a data from a transmission station; determining, based on reception responses from other communication stations, whether communication station which has not normally received the data from the transmission station exists among the other communications; and upon normally receiving the data from the transmission station, and determining that the communication station which has not normally received the data from the transmission station exists, transferring, to the communication station which has not normally received the data, the data received from the transmission station, wherein when transferring the data received from the transmission station, it is decided, based on a predetermined priority order, whether or not to perform the transfer to the communication station which has not normally received the data.

According to a third aspect of the present invention, there is provided a computer-readable storage medium storing a computer program, the computer program causing a computer incorporated in communication station to function as: a reception unit configured to receive data from a transmission station; a response unit configured to transmit a reception response representing a reception condition of the data by the reception unit; a determination unit configured to determine, based on reception responses from other communication stations, whether r communication station which has not normally received the data from the transmission station exists among the other communications; and a transfer unit configured to, when the reception unit has normally received the data from the transmission station, and the determination unit has determined that the communication station which has not normally received the data from the transmission station exists, transfer, to the communication station which has not normally received the data, the data received by the reception unit, wherein the transfer unit decides, based on a predetermined priority order, whether or not to perform the transfer to the communication station which has not normally received the data.

According to a fourth aspect of the present invention, there is provided a communication system including a transmission station which transmits data, and a plurality of communication stations which receive the data from the transmission station, each communication station comprising: a reception unit configured to receive data from the transmission station; a response unit configured to transmit a reception response representing a reception condition of the data by the reception unit; a determination unit configured to determine, based on reception responses from other communication stations, whether communication station which has not normally received the data from the transmission station exists among the other communications; and a transfer unit configured to, when the reception unit has normally received the data from the transmission station, and the determination unit has determined that the communication station which has not normally received the data from the transmission station exists, transfer, to the communication station which has not normally received the data, the data received by the reception unit, wherein the transfer unit decides, based on a predetermined priority order, whether or not to perform the transfer to the communication station which has not normally received the data.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
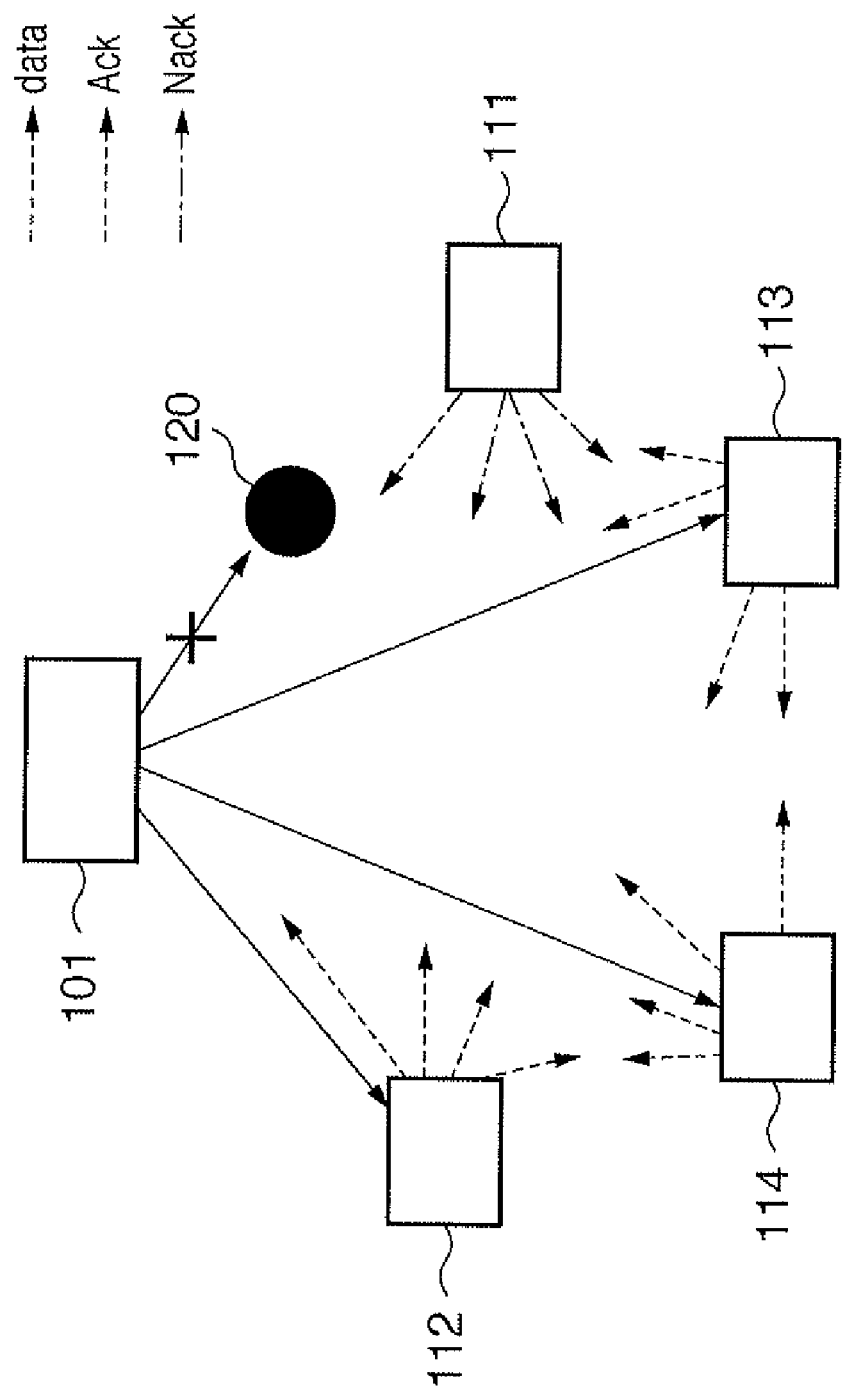
FIG. 1 is a view showing an example of the overall arrangement of a communication system according to an embodiment of the present invention.

FIG. 1 is a view showing an example of the overall arrangement of a communication system according to an embodiment of the present invention.

Reference numeral 101 denotes a communication station on the transmitting side (to be referred to as a transmission station hereinafter); and reference numerals 111 to 114, communication stations on the receiving side (to be referred to as reception stations hereinafter) which receive data from the transmission station 101. An obstructer 120 obstructs a wireless signal. In this case, the obstructer 120 obstructs wireless signal transmission from the transmission station 101 to the reception station 111.

Each of the transmission station 101 and the reception stations 111 to 114 incorporates a computer. The computer includes, for example, a main control unit such as a CPU, and storage units such as a ROM (Read Only Memory) and a RAM (Random Access Memory). The computer also includes an input/output unit such as a display or a touch panel, and a communication unit such as a wireless network card. These constituent elements are connected via a bus and controlled by causing the main control unit to execute programs stored in the storage unit.

Figure 2:
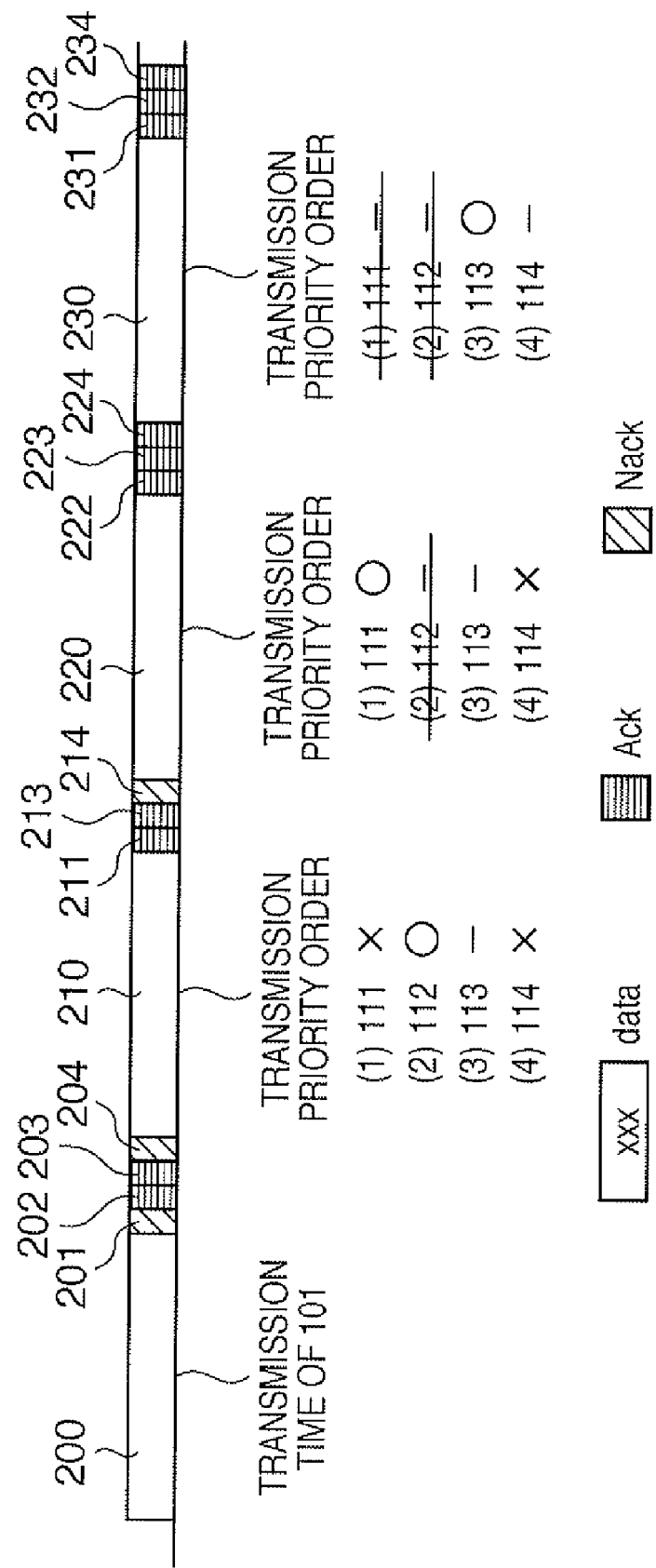
FIG. 2 is a view showing an outline of communication in the communication system shown in FIG. 1.

FIG. 2 is a view showing an outline of communication in the communication system shown in FIG. 1.

Communication of each communication station is separated at predetermined time intervals (timeslots). Reference numeral 200 denotes a transmission timeslot of the transmission station 101; reference numerals 210, 220, and 230, relay timeslots of the reception stations 111 to 114; and reference numerals 201 to 204, 211, 213, 214, 222 to 224, 231, 232, and 234, reception responses of the reception stations. A reference numeral that ends in 1 represents a reception response of the reception station 111. A reference numeral that ends in 2 represents a reception response of the reception station 112. That is, in FIG. 2, the last digits of reference numerals of the reception responses indicate the correspondence to the reception stations 111 to 114.

In the transmission timeslot 200, each of the reception station 112 and 113 returns a normal reception signal Ack by multicast within a predetermined time in response to data transmitted from the transmission station 101. Each of the reception stations 111 and 114 returns an abnormal reception signal Nack.

In the relay timeslot 210 executed after the transmission timeslot, the reception station 111 has a transmission authorization of the highest priority order. However, the reception station 111 has not normally received the data from the transmission station 101. For this reason, the reception station 112 having the second highest priority order transfers the data (to be also referred to as relay transmission hereinafter). The reception station 112 has received the Nack multicast from the reception station 111, and therefore recognizes that the reception station 111 has not normally received the data. Even when the reception station 112 relay-transmits the data in the relay timeslot 210, the reception station 114 returns the Nack 214. That is, the reception station 114 cannot normally receive the data.

Since the reception station 111 has normally received the data in the relay timeslot 220, the reception station 111 having the highest transmission priority order relay-transmits the data in the relay timeslot 220. The reception station 114 which has not received any data yet also normally receives the data in this relay transmission. That is, all reception stations have succeeded in data reception. Hence, after the reception response 224, any reception stations do not perform data transmission/reception until the transmission station 101 transmits next data.

An outline of data communication from the transmission station 101 to the reception stations 111 to 114 has been described above. In the above description, after performing relay transmission in the relay timeslot 210, the reception station 112 is excluded from the transmission priority order list of the subsequent relay timeslots. Instead of removing the reception station from the list, its priority order may be lowered. In the above description, the transmission station 101 and the communication stations (to be referred to the relay stations hereinafter) which perform relay transmission return no reception response. However, to simplify reception response timeslot management, the reception response timeslots for the relay stations may be left. If each reception station has a unit to know the time of the next transmission timeslot, the reception response timeslot of a reception station which has already transmitted an Ack may be omitted.

Figure 3:
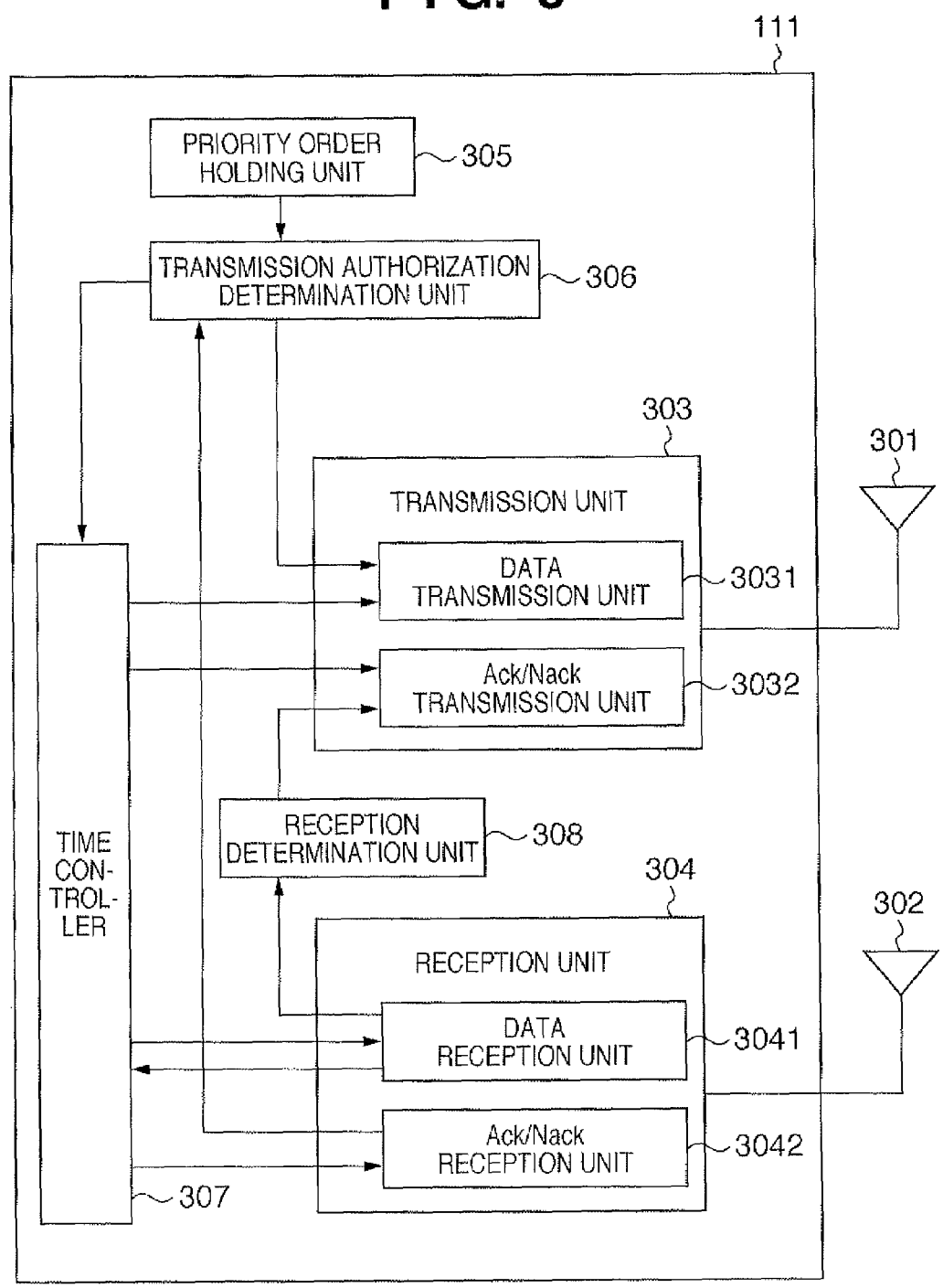
FIG. 3 is a block diagram showing an example of the functional arrangement of a reception station shown in FIG. 1.

An example of the functional arrangement of a reception station shown in FIG. 1 will be explained with reference to FIG. 3. The functional arrangement will be described here using the reception station 111 as a typical example. The reception stations 112 to 114 also adopt the same arrangement.

The reception station 111 includes a transmission antenna 301, reception antenna 302, transmission unit 303, and reception unit 304. A priority order holding unit 305 holds the transmission priority orders of the reception stations in each relay timeslot. The priority orders held by the priority order holding unit 305 change in every relay timeslot.

A transmission authorization determination unit 306 determines transmission authorization acquisition in each relay timeslot. A time controller 307 manages each transmission timeslot. The time controller 307 controls, for example, the timing of receiving data from the transmission station 101 or another reception station and the timing of receiving a reception response from each reception station. The reception station 111 adjusts the time of the time controller 307 based on received data, and synchronizes with the transmission station or another reception station. A reception determination unit 308 determines whether data is normally received. The reception station has been described above.

Figure 4:
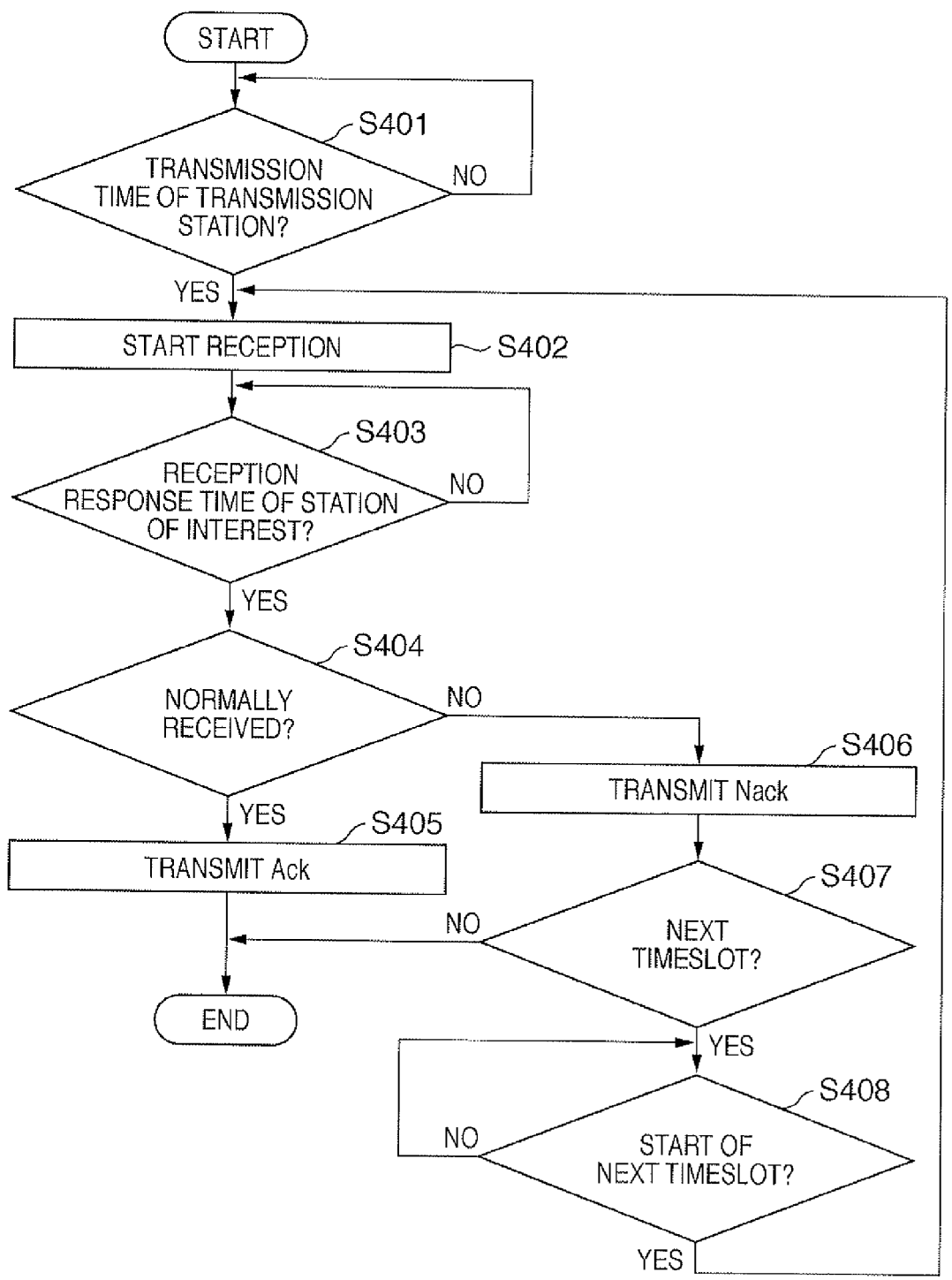
FIG. 4 is a first flowchart illustrating an example of the sequence of processing in each reception station shown in FIG. 1.
Figure 5:
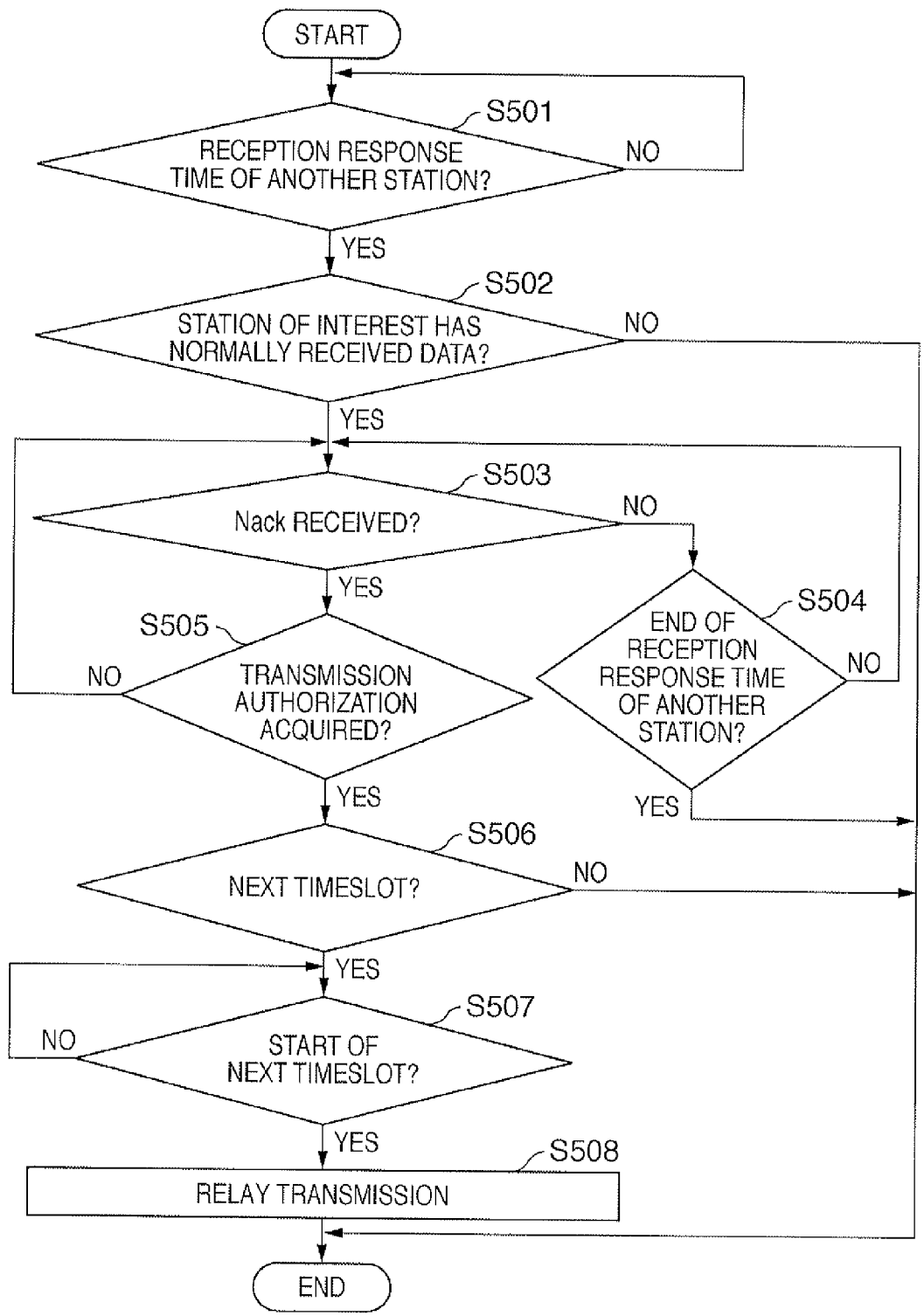
FIG. 5 is a second flowchart illustrating an example of the sequence of processing in each reception station shown in FIG. 1.

FIGS. 4 and 5 are flowcharts illustrating an example of the sequence of processing in the reception stations 111 to 114.

The sequence of processing of receiving data from the transmission station 101 and processing in the reception response time of the reception station of interest after data reception will be described first with reference to FIG. 4.

The reception station knows the transmission timeslot of the transmission station 101 in advance. When the transmission time of the transmission station 101 has come (YES in step S401), the reception station starts reception (step S402).

In the reception response time of the reception station of interest (YES in step S403), the reception station transmits a reception response in accordance with the reception condition of data from the transmission station 101. If data reception is normally performed (YES in step S404), the reception station multicasts the normal reception response Ack (step S405), and ends the processing.

If data reception is not normally performed (NO in step S404), the reception station multicasts the abnormal reception response Nack (step S406). After transmitting the Nack, the reception station waits until the next relay timeslot (YES in step S407 and then NO in step S408). If data reception still fails even after all relay timeslots for one transmission data (NO in step S407), the reception station abandons acquisition of the data. In this case, the reception station waits until the next transmission timeslot of the transmission station 101 to acquire next transmission data.

Processing in the reception response time of another reception station will be described next with reference to FIG. 5.

This processing starts when the reception response time of any other reception station (except the reception station of interest) has come (YES in step S501). When the processing starts, the reception station determines whether data is normally received. If data is not normally received (NO in step S502), the processing ends. This is because relay transmission is impossible if data is not normally received.

If data is normally received (YES in step S502), the reception station checks whether reception responses from the remaining reception stations include a Nack. If no Nack is received even after the reception response time of the other station (NO in step S503 and then YES in step S504), the reception station ends the processing, and waits until the next transmission timeslot of the transmission station.

If a Nack is detected from the reception responses received from the other reception stations (YES in step S503), the reception station determines the transmission authorization in the next relay timeslot. The transmission priority order of each terminal is predetermined in a relay timeslot. The reception station which has already received the data from the transmission station 101 acquires the transmission authorization in the next relay timeslot if no other reception station having a transmission priority order higher than that of the reception station of interest has normally received the data.

Upon acquiring the transmission authorization (YES in step S505), the reception station waits until the next relay timeslot. When the next relay timeslot starts (YES in step S506 and then YES in step S507), the reception station performs relay transmission for other reception stations which have failed in normally receiving the data (step S508), and ends the processing. If all the relay timeslots have ended so there is no next relay timeslot anymore (NO in step S506), the processing ends.

Second Embodiment

The second embodiment will be described next. The overall arrangement of the second embodiment is the same as in FIG. 1 of the first embodiment, and a description thereof will not be repeated.

Figure 6:
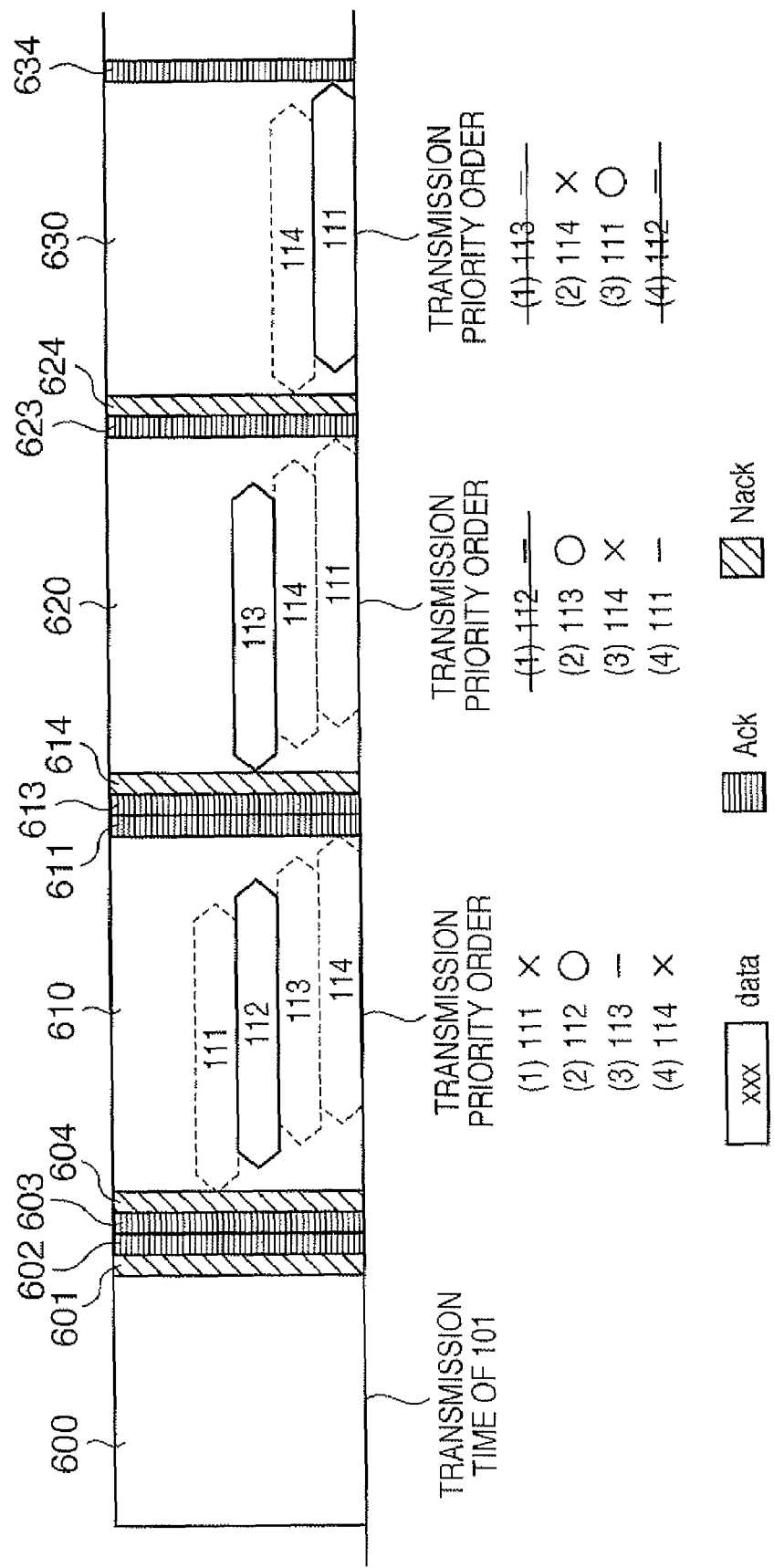
FIG. 6 is a view showing an outline of communication in a communication system according to the second embodiment.

FIG. 6 is a view showing an outline of communication in a communication system according to the second embodiment.

Communication of each communication station is separated at predetermined time intervals (timeslots). Reference numeral 600 denotes a transmission timeslot of a transmission station 101; 610, 620, and 630, relay timeslots of reception stations; and 601 to 604, 611, 613, 614, 623, 624, and 634, reception responses of the reception stations. As in the first embodiment, reference numeral that ends in 1 represents a reception response of a reception station 111. Reference numeral that ends in 2 represents a reception response of a reception station 112. That is, in FIG. 6, the last digits of reference numerals of the reception responses indicate the correspondence to the reception stations.

In the second embodiment, each reception station performs communication by CSMA (Carrier Sense Multiple Access). Each reception station executes back-off time management and carrier sense in a relay timeslot, thereby dynamically controlling the transmission station 101.

In the transmission timeslot 600, each of the reception station 112 and 113 returns a normal reception signal Ack in response to data transmitted from the transmission station 101. Each of the reception stations 111 and 114 returns an abnormal reception signal Nack.

In the relay timeslot 610 executed after the transmission timeslot, the reception station 111 has a transmission authorization of the highest priority order. In the relay timeslot 610, the reception station 111 has a right to transmit without a back-off time. However, the reception station 111 has not normally received the data from the transmission station 101, and therefore does not perform transmission in the relay timeslot 610. In this case, the reception station 112 having the second highest priority order waits for a (e.g., shortest) back-off time, and executes carrier sense. The reception station 112 checks the transmission condition of the other reception station (the reception station 111 in this case) by carrier sense, confirms that the other reception station (the reception station 111 in this case) does not perform data transmission, and then executes relay transmission. The reception station 113 must wait for a back-off time longer than that of the reception station 112. This aims at shifting the transmission start time in the relay timeslot. The reception station 113 waits for the back-off time, and then performs carrier sense. At this time, the reception station 113 detects the carrier of the reception station 112 and loses the transmission authorization. Even when the reception station 112 relay-transmits the data, the reception station 114 returns the Nack 614. That is, the reception station 114 cannot normally receive the data.

The reception station 112 having the highest transmission priority order has already performed relay transmission. Hence, in the relay timeslot 620, the reception station 113 acquires a transmission authorization, and executes relay transmission without waiting for a back-off time. In this case, even when the reception station 113 relay-transmits the data, the reception station 114 still returns the Nack 624. That is, the reception station 114 cannot normally receive the data.

In the relay timeslot 630, the reception station 113 having the highest transmission priority order is excluded from the relay station list because it has already performed relay transmission. In the relay timeslot 630, the reception station 114 having the second highest priority order has a transmission authorization. However, the reception station 114 does not perform relay transmission because it has failed in normally receiving the data. In this case, the reception station 111 waits for a back-off time, performs carrier sense of the reception station 114, and then executes relay transmission.

An outline of data communication from the transmission station 101 to the reception stations according to the second embodiment has been described above. In the above description, the reception stations (e.g., the reception stations 112 and 113) which have performed relay transmission are excluded from the transmission priority order list of the subsequent relay timeslots. Instead of removing the reception stations from the list, their priority orders may be lowered. In the above description, the transmission station 101 and the relay stations return no reception response. However, to simplify reception response timeslot management, the reception response timeslots for the relay stations may be left. If each reception station has a unit to know the time of the next transmission timeslot, the reception response timeslot of a reception station which has already transmitted an Ack may be omitted.

Figure 7:
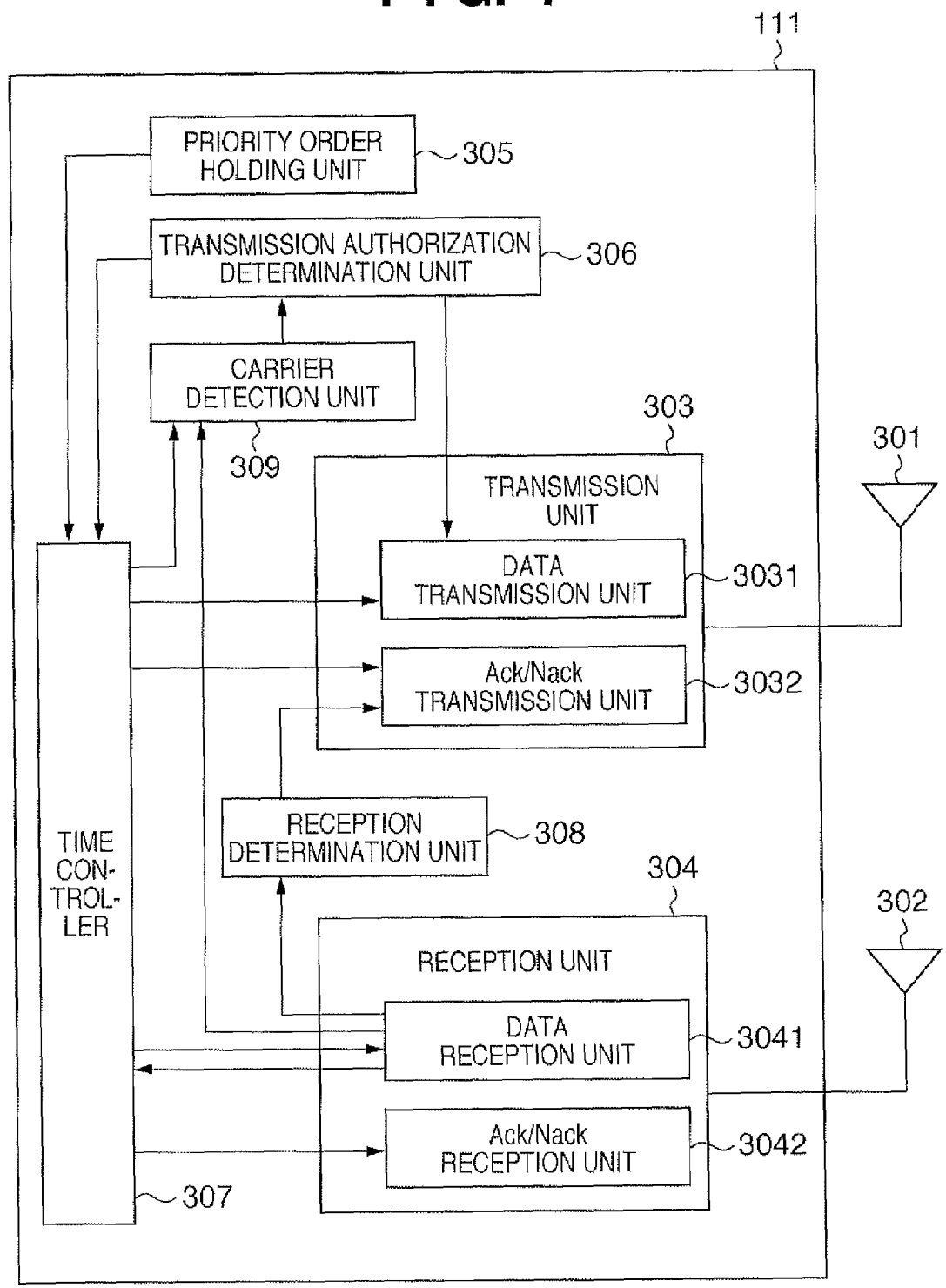
FIG. 7 is a block diagram showing an example of the functional arrangement of a reception station according to the second embodiment.

An example of the functional arrangement of a reception station according to the second embodiment will be explained with reference to FIG. 7. The functional arrangement will be described here using the reception station 111 as a typical example. The reception stations 112 to 114 also adopt the same arrangement. Note that the same reference numerals as in FIG. 3 of the first embodiment denote the same parts in FIG. 7, and only the differences between FIGS. 3 and 7 will be described.

A carrier detection unit 309 performs carrier sense after waiting for a back-off time controlled by a time controller 307.

The time controller 307 decides the back-off times of the reception stations in a relay timeslot based on their transmission priority orders. A transmission authorization determination unit 306 determines the presence/absence of a transmission authorization based on the carrier detection result (the presence/absence of the carrier of another reception station) of the carrier detection unit 309.

The reception station according to the second embodiment has been described above. The sequence of processing in each of the reception stations 111 to 114 is the same as in FIGS. 4 and 5 of the first embodiment, and a detailed description thereof will not be repeated. The second embodiment is slightly different from the first embodiment in the transmission authorization determination processing in step S505 of FIG. 5. In the second embodiment, transmission authorization acquisition is determined by back-off time setting based on the CSMA and the transmission priority order.

Third Embodiment

The third embodiment will be described next.

Figure 8:
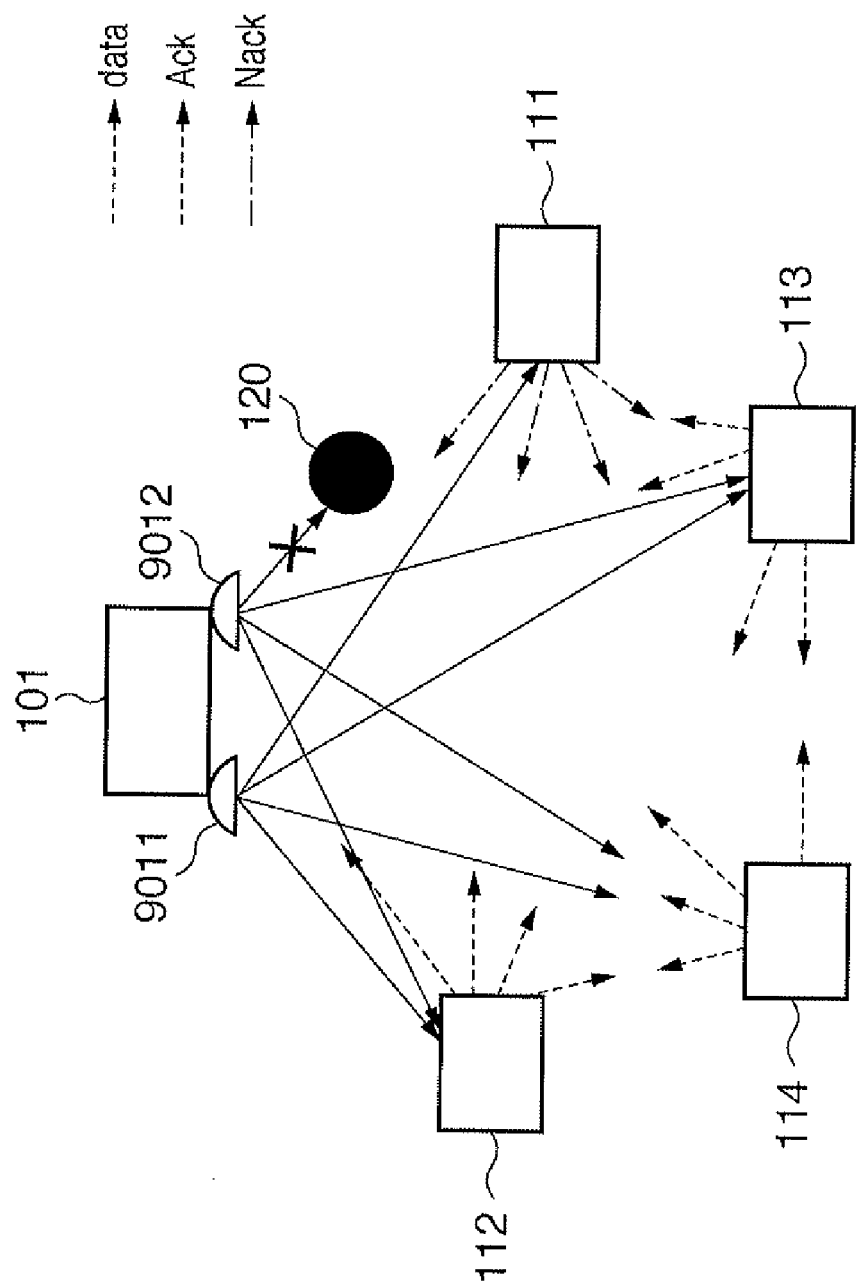
FIG. 8 is a view showing an example of the overall arrangement of a communication system according to the third embodiment.

FIG. 8 is a view showing an example of the overall arrangement of a communication system according to the third embodiment.

Reference numeral 101 denotes a transmission station; and reference numerals 111 to 114, reception stations which receive data from the transmission station 101. An obstructer 120 obstructs a wireless signal. The transmission station 101 of the third embodiment has two transmission antennas 9011 and 9012.

Figure 9:
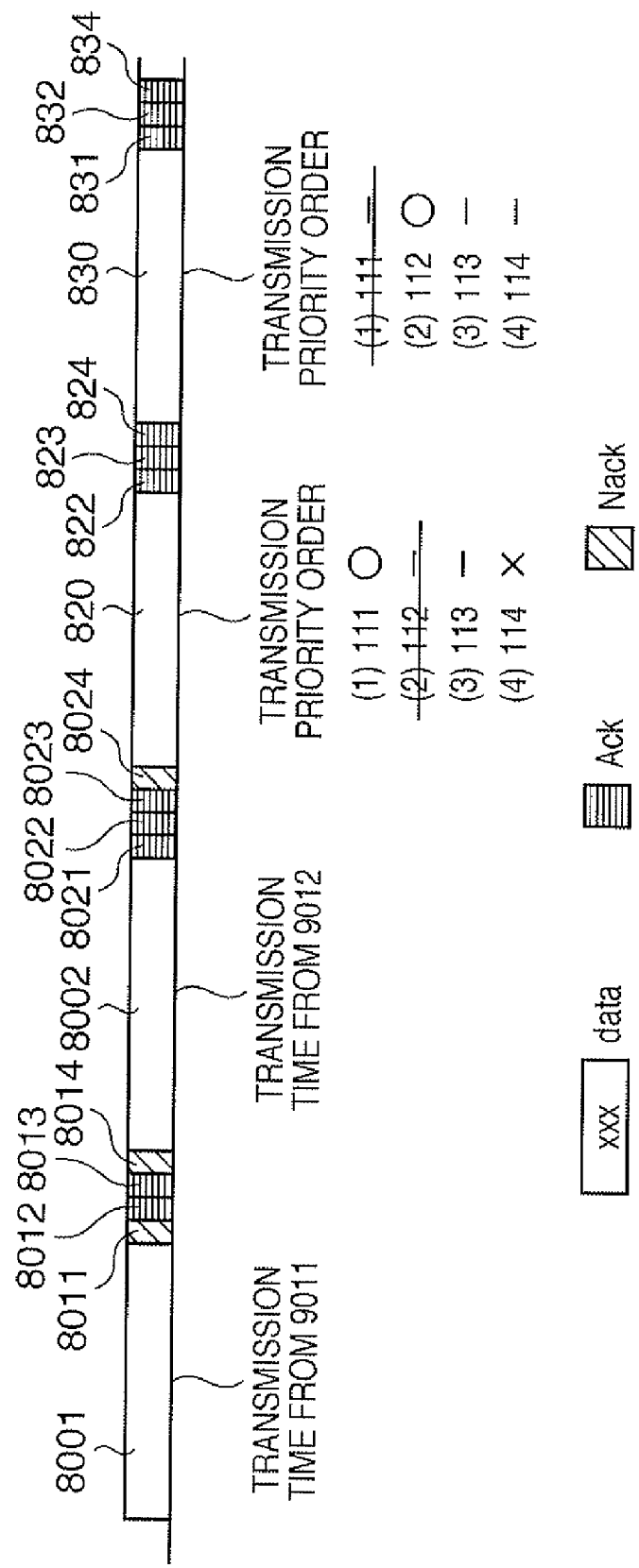
FIG. 9 is a view showing an outline of communication in the communication system according to the third embodiment.

FIG. 9 is a view showing an outline of communication in the communication system according to the third embodiment.

The transmission station 101 performs transmission diversity in transmission timeslots 8001 and 8002. The transmission diversity allows a reception station 111 to avoid transmission obstruction by the obstructer 120. Note that even the transmission diversity by the transmission station 101 cannot make a reception station 114 normally receive data. When the reception station 111 performs relay transmission in a relay timeslot 820, the reception station 114 can normally receive the data.

Figure 10:
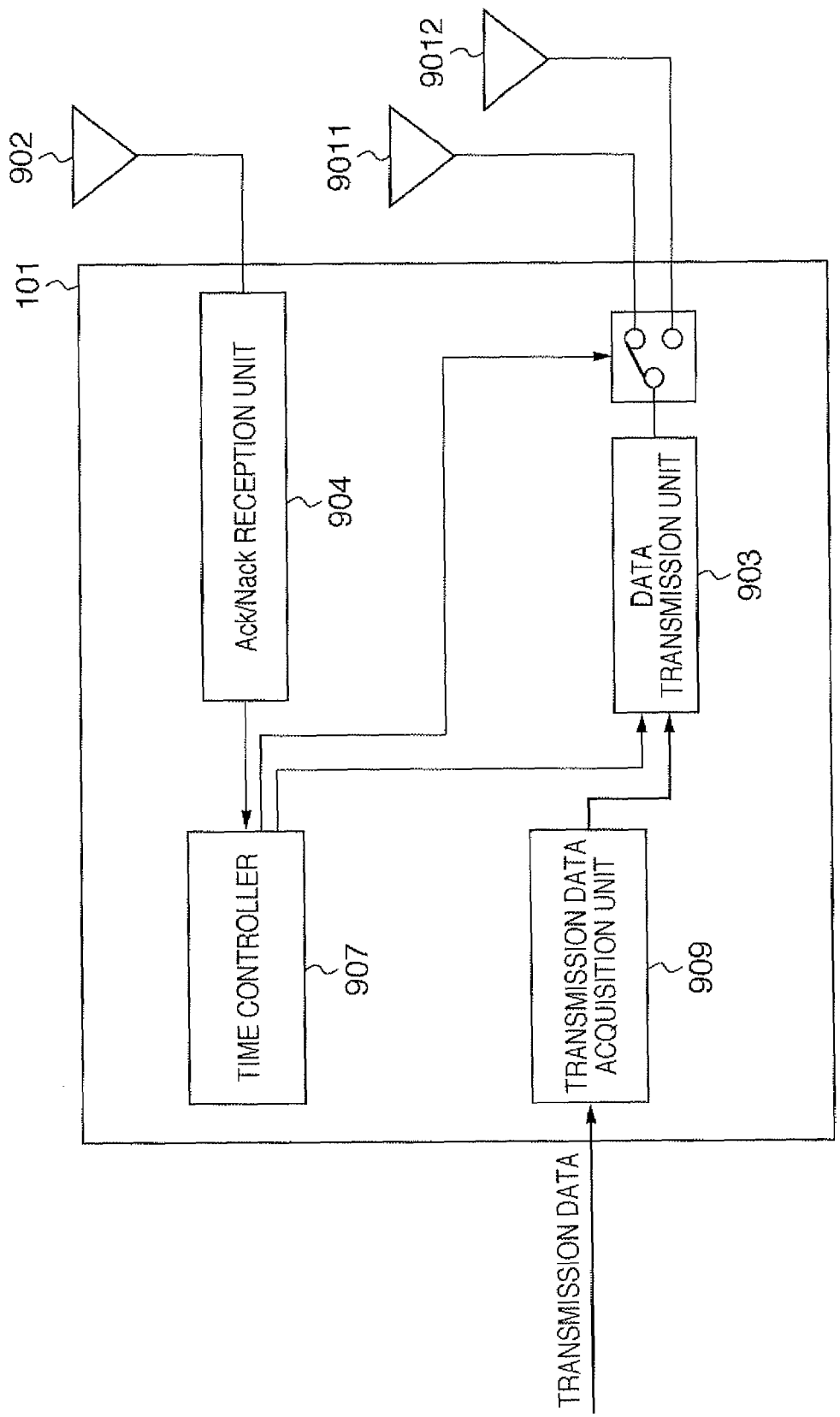
FIG. 10 is a block diagram showing an example of the functional arrangement of a transmission station according to the third embodiment.

FIG. 10 is a block diagram showing an example of the functional arrangement of a transmission station according to the third embodiment.

The transmission station 101 includes the transmission antennas 9011 and 9012, a reception antenna 902, a data transmission unit 903, and an Ack/Nack reception unit 904 to receive a reception response (Ack/Nack) from each reception station. A time controller 907 manages each timeslot. The time controller 907 controls the data transmission timing, the timing of switching between the transmission antennas 9011 and 9012, and the timing of receiving a reception response from each reception station. A transmission data acquisition unit 909 acquires data to be transmitted to each reception station.

The transmission station according to the third embodiment has been described above. The arrangement and the sequence of processing in each reception station are the same as in the first and second embodiments, and a description thereof will not be repeated.

As described above, according to the first to third embodiments, a reception station which has normally received data relay-transmits it to another reception station which has failed in data reception. This increases the reliability of data communication. Data transmission is not done for a reception station which has already normally received the data. This eliminates redundant data transmission/reception, reduces power consumption, and controls traffic. Without redundant data transmission/reception, it is possible to reduce interference noise in, for example, a space where another system overlaps.

In the first to third embodiments, an operation in multicast communication has been described. If the number of communication stations is known, almost the same operation can be performed even in broadcast communication. A reception station may return not an Ack but only a Nack, or conversely, not a Nack but only an Ack.

In the first to third embodiments, expressions "transmission station" and "reception station" are used in the descriptions. However, every communication station can serve as a transmission station. A transmission station and a reception station need not always have the relationship of a master station and a slave station.

Typical embodiments of the present invention have been described above. The present invention is not limited to the embodiments described and illustrated above, and various changes and modifications can be made appropriately within the spirit and scope of the present invention.

The present invention can take a form of, for example, a system, apparatus, method, program, or recording medium. More specifically, the present invention is applicable to a system including a plurality of devices, or an apparatus including a single device.

The present invention also incorporates a case in which the functions of the above-described embodiments are achieved by supplying a software program to the system or apparatus directly or from a remote site and causing the computer incorporated in the system or apparatus to read out and execute the supplied program code. In this case, the supplied program is a computer program corresponding to the flowcharts illustrated in the embodiments.

Hence, the program code itself, which is installed in the computer to implement the functional processing of the present invention by the computer, also implements the present invention. That is, the present invention incorporates the computer program itself for implementing the functional processing of the present invention. In this case, the program can take any form such as an object code, a program to be executed by an interpreter, or script data to be supplied to the OS (Operating System) as long as the functions of the program can be obtained.

Examples of the computer-readable recording medium to supply the computer program are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

As another program supply method, a client computer may be connected to a homepage on the Internet by using a browser to download the computer program of the present invention from the homepage to a recording medium such as a hard disk. In this case, the program to be downloaded may be a compressed file containing an automatic installation function. The program code contained in the program of the present invention may be divided into a plurality of files, and the files may be downloaded from different homepages. That is, the present invention also incorporates a WWW server which causes a plurality of users to download a program file that implements the functional processing of the present invention by a computer.

The program of the present invention may be encrypted, stored in a recording medium such as a CD-ROM, and delivered to users. Any user who satisfies predetermined conditions may be allowed to download key information for decryption from a homepage via the Internet so that he/she can execute the encrypted program by using the key information and install the program in the computer.

The functions of the above-described embodiments can be implemented not only when the computer executes the readout program but also in cooperation with, for example, the OS running on the computer based on the instructions of the program. In this case, the OS or the like partially or wholly executes actual processing, thereby implementing the functions of the above-described embodiments.

Alternatively, some or all of the functions of the above-described embodiments may be implemented by writing the program read out from the recording medium in the memory of a function expansion board inserted into the computer or a function expansion unit connected to the computer. In this case, after the program is written in the function expansion board or function expansion unit, the CPU of the function expansion board or function expansion unit partially or wholly executes actual processing based on the instructions of the program.

According to the present invention, it is possible to increase the reliability of data communication and suppress redundant data communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-095434 filed on Apr. 1, 2008, which is hereby incorporated by reference herein in its entirety.

What is claimed is:

1. A communication station comprising:
   a reception unit constructed to receive data from a transmission station;
   a response unit constructed to transmit a reception response representing a reception condition of the data by the reception unit;
   a determination unit constructed to determine, based on reception responses from other communication stations, whether an unreceived communication station which has not normally received the data from the transmission station exists among the other communication stations, and to determine whether one of the other communication stations, which has normally received the data from the transmission station, has a higher transmission priority order than a transmission priority order of the communication station; and
   a transfer unit constructed to, when the reception unit has normally received the data from the transmission station, and the determination unit has determined that the unreceived communication station exists, and has determined that no other communication station, which has normally received the data from the transmission station, has a higher transmission priority order than the transmission priority order of the communication station, transfer the data received by the reception unit to the unreceived communication station,
   wherein when the reception unit has not normally received the data from the transmission station, the reception unit receives the data which is transferred thereto by one of the other communication stations which has normally received the data, and
   wherein the transmission priority order defines a transmission priority order of each station in a relay timeslot in which the data transmitted from the transmission station is relayed, and the transfer unit performs the transfer based on the transmission priority order.

2. The station according to claim 1, wherein the transfer unit shifts a start time of the transfer in the relay timeslot based on the transmission priority order of each station.

3. The station according to claim 1, wherein the transmission priority order of each station changes in every relay timeslot.

4. The station according to claim 1, wherein transmission of the reception response by the response unit is done after one of a transmission timeslot in which the transmission station transmits the data and a relay timeslot in which the data received from the transmission station is relayed.

5. The station according to claim 1, wherein the transfer unit checks a data transmission condition of the other communication stations upon transferring, and if at least one of the other communication stations is not performing data transmission, performs the transfer.

6. A communication method of a communication station, comprising:

transmitting a reception response representing a reception condition of data from a transmission station;

determining, based on reception responses from other communication stations, whether an unreceived communication station which has not normally received the data from the transmission station exists among the other communication stations, and determining whether one of the other communication stations, which has normally received the data from the transmission station, has a higher transmission priority order than a transmission priority order of the communication station; and upon normally receiving the data from the transmission station, and determining that the unreceived communication station exists, and upon determining that no other communication station, which has normally received the data from the transmission station, has a higher transmission priority order than the transmission priority order of the communication station, transferring the received data to the unreceived communication station, wherein when the communication station has not normally received the data from the transmission station, the communication station receives the data which is transferred thereto by one of the other communication stations which has normally received the data, and wherein the transmission priority order defines a transmission priority order of each station in a relay timeslot in which the data transmitted from the transmission station is relayed, and the transfer is performed based on the transmission priority.

7. A non-transitory computer-readable storage medium retrievably storing a computer program, the computer program causing a computer incorporated in a communication station to function as:

a reception unit constructed to receive data from a transmission station;

a response unit constructed to transmit a reception response representing a reception condition of the data by the reception unit;

a determination unit constructed to determine, based on reception responses from other communication stations, whether an unreceived communication station which has not normally received the data from the transmission station exists among the other communication stations, and to determine whether one of the other communication stations, which has normally received the data from the transmission station, has a higher transmission priority order than a transmission priority order of the communication station; and a transfer unit constructed to, when the reception unit has normally received the data from the transmission station, and the determination unit has determined that the unreceived communication station exists, and has determined that no other communication station, which has normally received the data from the transmission station, has a higher transmission priority order than the transmission priority order of the communication station, transfer the data received by the reception unit to the unreceived communication station, wherein when the reception unit has not normally received the data from the transmission station, the reception unit receives the data which is transferred thereto by one of the other communication stations which has normally received the data, and wherein the transmission priority order defines a transmission priority order of each station in a relay timeslot in which the data transmitted from the transmission station is relayed, and the transfer unit performs the transfer based on the transmission priority order.

8. A communication system including a transmission station which transmits data, and a plurality of communication stations which receive the data from the transmission station, each communication station comprising:

a reception unit constructed to receive data from the transmission station;

a response unit constructed to transmit a reception response representing a reception condition of the data by the reception unit;

a determination unit constructed to determine, based on reception responses from other communication stations, whether an unreceived communication station which has not normally received the data from the transmission station exists among the other communication stations, and to determine whether one of the other communication stations, which has normally received the data from the transmission station, has a higher transmission priority order than a transmission priority order of the communication station; and a transfer unit constructed to, when the reception unit has normally received the data from the transmission station, and the determination unit has determined that the unreceived communication station exists, and has determined that no other communication station, which has normally received the data from the transmission station, has a higher transmission priority order than the transmission priority order of the communication station, transfer the data received by the reception unit to the unreceived communication station, wherein when the reception unit has not normally received the data from the transmission station, the reception unit receives the data which is transferred thereto by one of the other communication stations which has normally received the data, and wherein the transmission priority order defines a transmission priority order of each station in a relay timeslot in which the data transmitted from the transmission station is relayed, and the transfer unit performs the transfer based on the transmission priority order.

* * * * *